(12) United States Patent
Olsen

(10) Patent No.: US 6,826,990 B2
(45) Date of Patent: Dec. 7, 2004

(54) CUTTER TRIMMER SORTER

(75) Inventor: David Olsen, Grande Prairie (CA)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/108,216

(22) Filed: Mar. 26, 2002

(65) Prior Publication Data
US 2003/0183052 A1 Oct. 2, 2003

(51) Int. Cl.[7] .......................... B27B 31/00; B07C 5/14
(52) U.S. Cl. .................. 83/158; 209/517; 198/456
(58) Field of Search .......................... 209/517–521, 209/942; 198/456; 83/102, 155, 155.1, 158; 144/356, 242.1

(56) References Cited

U.S. PATENT DOCUMENTS

| | | | |
|---|---|---|---|
| 996,386 A | * | 6/1911 | Williams .................. 209/521 |
| 1,104,993 A | | 7/1914 | Kramer |
| 2,636,601 A | * | 4/1953 | Bovay, Jr. et al. .......... 209/520 |
| 2,918,951 A | * | 12/1959 | Haumann .................. 198/456 |
| 3,116,835 A | * | 1/1964 | Brandon .................... 209/520 |
| 3,279,600 A | | 10/1966 | Lawson |
| 3,368,700 A | * | 2/1968 | Tarrant ..................... 209/521 |
| 3,557,952 A | | 1/1971 | Heikinheimo |
| 3,565,140 A | | 2/1971 | Jacobsen |
| 3,756,297 A | | 9/1973 | Heikinheimo |
| 4,023,605 A | | 5/1977 | Hellström et al. |
| 4,069,910 A | * | 1/1978 | Faley et al. ................ 198/456 |
| 4,098,407 A | * | 7/1978 | Moore ....................... 209/517 |
| 4,120,333 A | | 10/1978 | Hellgren et al. |
| 4,638,440 A | | 1/1987 | Brough et al. |
| 4,919,273 A | * | 4/1990 | Kruit et al. ................ 209/517 |

* cited by examiner

Primary Examiner—Stephen Choi
(74) Attorney, Agent, or Firm—Christensen O'Connor Johnson Kindness PLLC

(57) ABSTRACT

An apparatus for cutting and sorting boards conveys the boards along a conveyor path. The apparatus senses the length of boards and the grade of boards, and cuts selected boards into first and second segments. The first and second segments are aligned against lumber lines respectively on each side of a conveyor path. The boards are then selectively sorted and dropped into bins successively positioned along each side of the conveyor path.

4 Claims, 3 Drawing Sheets

CUTTER TRIMMER SORTER

FIELD OF THE INVENTION

The present invention relates to cutting and sorting of boards in a sawmill and planermill operation and, more particularly, to an automated system for cutting, trimming, and sorting boards into a plurality of receiving bins in an efficient manner.

BACKGROUND OF THE INVENTION

After rough sawn boards are produced in a sawmill, they are commonly run through a plurality of planing, grading, trimming, cutting, and sorting operations. In current cutting, trimming, sorting operations, a plurality of boards of various lengths, up to 20 ft. long, for example, are fed by a conveyor along a predetermined path in a machine direction. The boards are oriented orthogonally to the machine direction. The conveyor has lugs that advance the board through a sensing station. At the sensing station, shape properties of the board are determined, including length, width, wane (missing wood due to circular shape of the tree), crook and bow. These shape parameters are evaluated along the length of each board to determine the grade of various portions of the board. The board advances in front of a human operator who will make visual based grade decisions based on quality parameters that cannot be determined by the sensing station. The information from the sensing station and the human operator are sent to a programmable logic controller, where the data is analyzed to determine the optimal grade and length solution for the individual board. The programmable logic controller controls a plurality of saws that are spaced laterally across the conveyor at a sawing station. Depending upon the length and grade information, the board can either pass under the saws without being cut, or it can be cut at a predetermined location along the length of the board, depending upon the information received by the programmable logic controller from the sensing station and from the human operator.

After boards pass the sawing station, the boards pass over a plurality of aligning rollers. These rollers are oriented parallel to the machine direction and rotated in a clockwise direction looking in the machine direction. As the boards pass over these rollers, they are moved to the right looking in the machine direction, until their ends abut a rail running parallel to the right-hand side of the conveyor, normally referred to as a lumber line. If a board has been split in two segments, the programmable logic controller will leave an extra space on the conveyor so that the second segments of the board, which occupied one space on the conveyor when being cut, is now indexed so that it occupies a successive location on the conveyor. The second segments of the cut boards are also aligned against the right-hand lumber line.

Downstream from the aligning rollers lie a plurality of receiving bins. The receiving bins are positioned under the conveyor in a conventional manner. The programmable logic controller operates drop gates on the conveyor so that boards of common length and grade are dropped into predetermined bins. In this manner, a single bin receives boards of a single length and grade. The bins are periodically emptied and the boards subsequently stacked for shipment in a conventional manner.

Because each of the boards, whether a single uncut board or a board that has been cut in two, occupy one station on the conveyor downstream of the saws, the actual throughput of the cutter trimmer is reduced by the number of boards that are cut in two because the second segment must also be indexed against the right-hand lumber line. For example, if 10% of the boards are cut in two, then the actual throughput from the machine is reduced by 10%, relative to the number of boards that can be fed into the machine. It is therefore desirable to provide a method and apparatus for increasing the efficiency of the cutter-sorter of the type just described.

SUMMARY OF THE INVENTION

The present invention therefore provides an apparatus for cutting and sorting boards into variable lengths. A conveyor is provided to convey boards along a predetermined path in a machine direction. A sensor is positioned along the path for determining the shape parameters of the board, including length, width, wane, crook and bow. These shape parameters are evaluated along the length of each board to determine the grade of various portions of the board. The board advances in front of a human operator who will make visual-based grade decisions based on quality parameters that cannot be determined by the sensing station. The information from the sensing station and the human operator are sent to a programmable logic controller, where the data is analyzed to determine the optimal grade and length solution for the individual board. A programmable logic controller receives the length and grade signals and determines whether, and at what location along the length of the board, it will be cut into two segments. A saw is positioned along the path downstream from the sensor. The saw is controlled by the controller for cutting the board at the cutting location. Downstream of the saw, a first lumber line is provided adjacent the right side of the path and a second lumber line is provided adjacent the left side of the path. A first lateral conveyor is provided for moving boards laterally toward the right side of the path so that the right ends of the boards adjacent the right side of the conveyor abut and are aligned with the first lumber line. A second lateral conveyor is provided for moving boards laterally toward the left side of the path so that the left ends of the boards adjacent the left side of the conveyor abut and are aligned with the second lumber line. Thereafter, a first plurality of bins are successively positioned under the right side of the conveyor path for selectively receiving boards of predetermined length and grade aligned against the first lumber line. A second plurality of bins are successively positioned adjacent the left side of the conveyor path for selectively receiving boards of predetermined length and grade that are aligned with the second lumber line.

A method of sawing and trimming boards comprises a plurality of steps including (a) feeding a plurality of boards past a sensing station on a conveyor; (b) sensing the length (and optionally the grade) of each board; (c) determining whether and at what location the board will be sawn; (d) sawing the board at the location; (e) aligning boards adjacent one side of said conveyor against a lumber line on that one side; (f) aligning boards adjacent the other side of said conveyor against a lumber line on that other side; (g) selectively placing boards adjacent the lumber line on the one side into a plurality of bins successively positioned adjacent the one side; and (h) selectively placing boards adjacent said other side in a plurality of bins successively positioned adjacent the other side.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
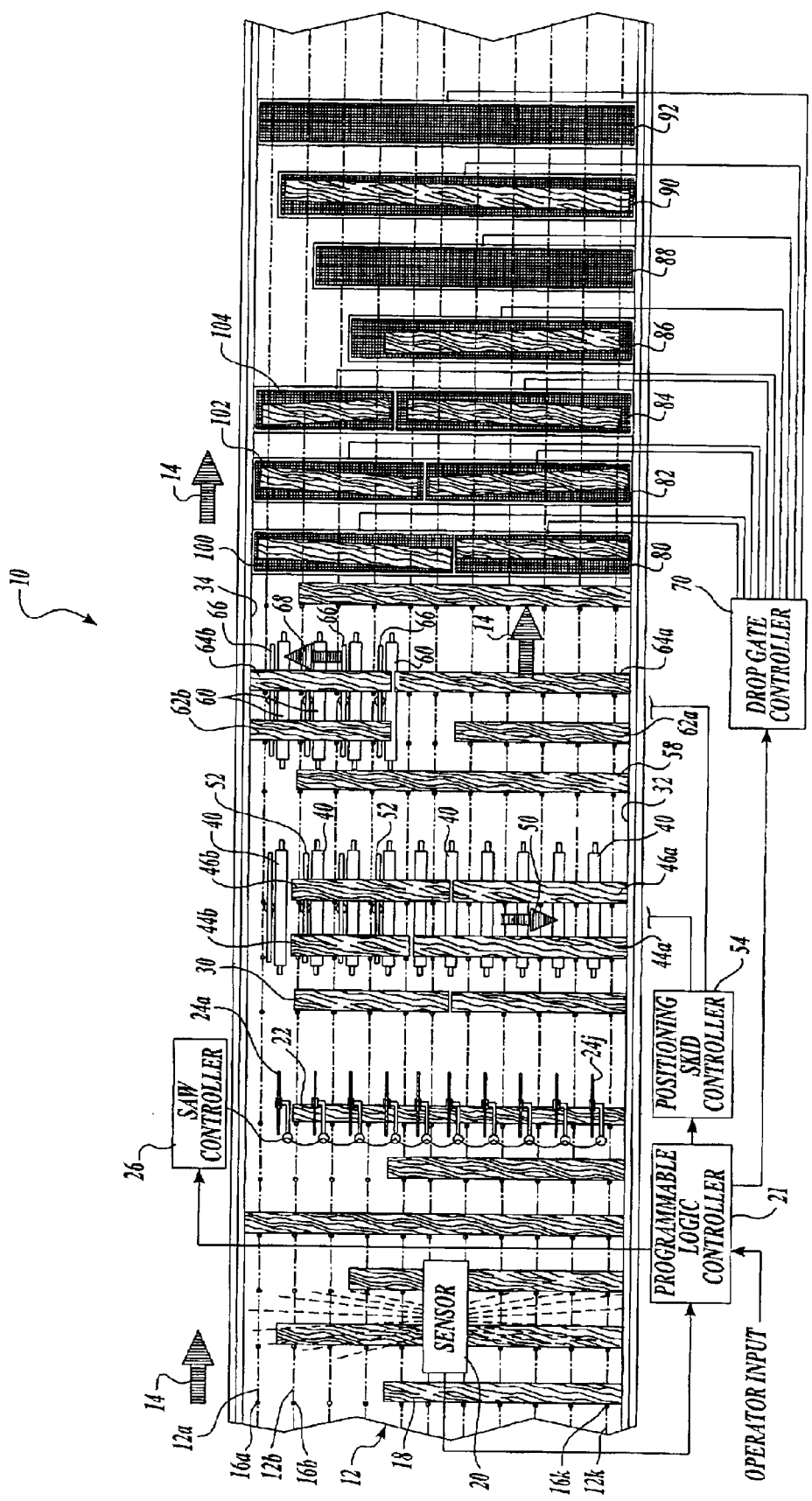
FIG. 1 is a schematic plan view of a cutter sorter constructed in accordance with the present invention.
Figure 2:
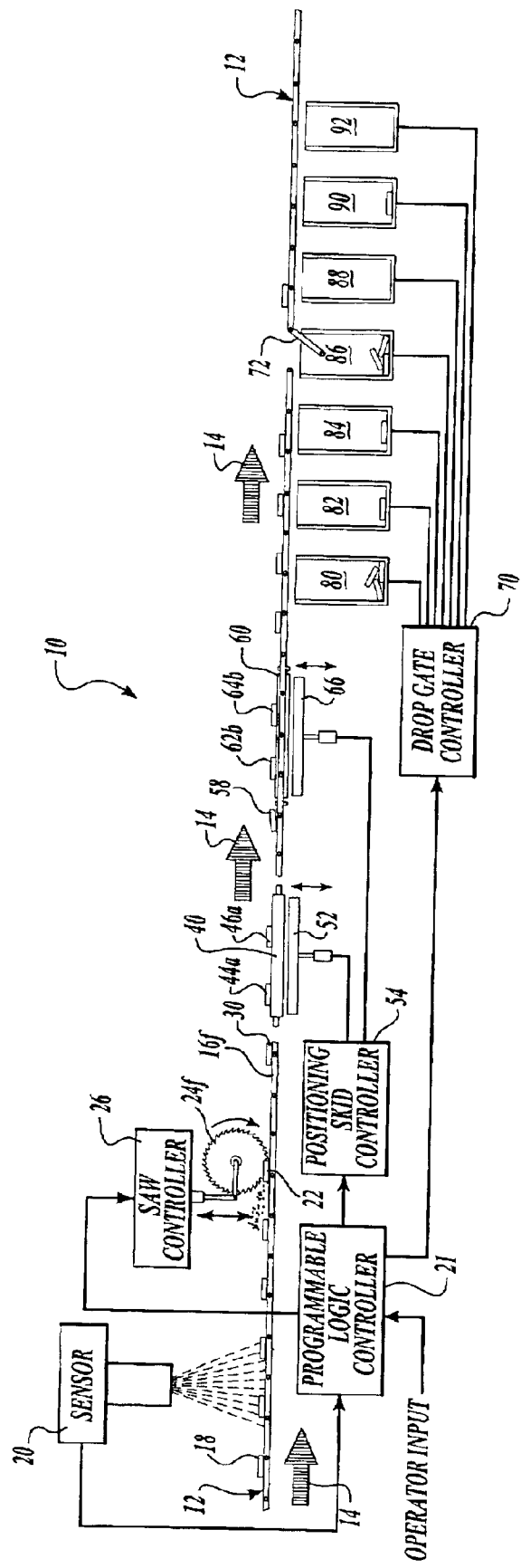
FIG. 2 is a schematic elevation view corresponding to FIG. 1.

Referring now to FIGS. 1 and 2, the cutter sorter 10 includes a conveyor 12 comprising a plurality of conveyor chains 12a–12k that are aligned in parallel runs. Only the upper portion of the runs are shown in FIGS. 1 and 2 for simplicity. The conveyor moves in a machine direction indicated by arrows 14. Each of the conveyor's chains 12a–12k carry upstanding lugs 16a–16k. The lugs 16a–16k are aligned laterally across the conveyor chains 12a–12k and are positioned at successive locations along the length of the conveyor chains 12a–12k. Each of the sets of lugs 16a–16k are spaced by the distance slightly greater than the width of the boards to be handled by the conveyor.

Boards, for example, board 18, are positioned on the conveyor 12 and are moved in the machine direction 14 via the conveyor chains 12a–12k and lugs 16a–16k. The boards may have various lengths ranging, for example, from 8 ft. to 20 ft. although, these lengths will depend upon the lumber produced by the sawmill, the trimming operations and the demands of the marketplace for various lengths of boards. The conveyor 12 moves each board past a sensing station where an optical sensor 20 scans the board and generates a signal indicative of the overall length of the board. Alternatively, the board may be scanned in the longitudinal direction prior to being placed on the conveyor. The optical sensor may also be employed to scan the shape of the boards and generate a signal indicative of the grade of the board, for example, whether the board has varying amounts of wane at various locations along the length of the board. In addition to the optical sensor, the board is graded by a human operator for visual defects the optical sensor cannot detect.

The sensing station provides a length and grading signal to a programmable logic controller 21. The programmable logic controller 21 also receives input from a human operator as to the most preferred lengths and grades of boards to be produced at a given time by the cutter sorter 10. This information is then processed by the programmable logic controller 21 to determine whether and at what location along its length a given board will be sawn. The boards are then conveyed to a sawing station. For example, board 22 is positioned under a plurality of rotary saws 24a–24j at the sawing station. The saws 24a–24j are positioned at laterally spaced locations along the conveyor 12 between each of the successive chains 12a–12k. The saws 24a–24j are mounted so as to be vertically moveable into and out of the path of the board 22 as it traverses under the saw station. The logic controller 21 sends a predetermined signal to the saw controller 26, providing information to lower the appropriate saw and cut board 22 at a predetermined location along its length. As shown in FIGS. 1 and 2, saw 24f has been lowered by the saw controller 26 so as to cut the board 22 into two equal lengths. The same operation has already been performed on board 30 downstream of the sawing station.

Stationary rails, commonly referred to as lumber lines, are provided along each side of the conveyor. The right-hand lumber line 32 is positioned longitudinally along the right-hand side of the conveyor 12 looking in the machine direction while a left-hand lumber line 34 extends longitudinally along the left-hand side of the conveyor 12. The rails are positioned at a level slightly above the upper surface of the conveyor 12. The lumber lines 32 and 34 are only shown in FIG. 1 and are omitted from FIG. 2 for simplicity.

Figure 3:
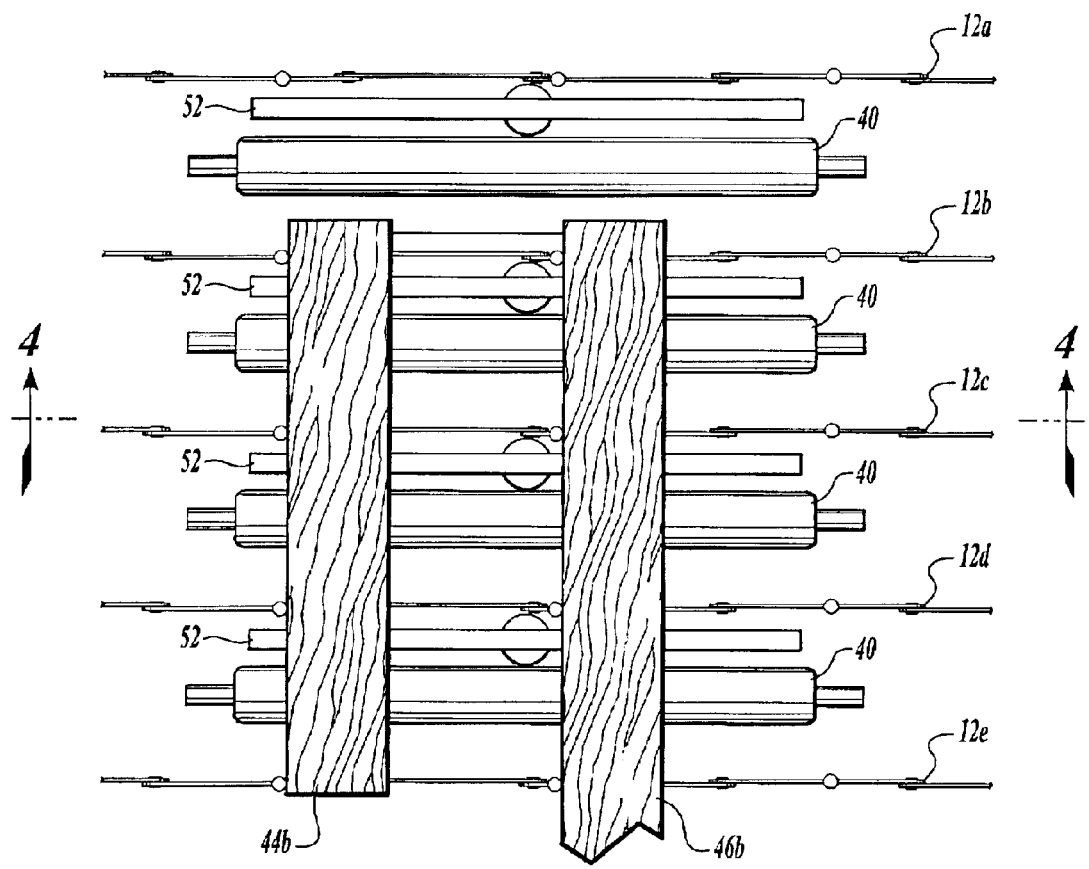
FIG. 3 is an enlarged plan view of a portion of a lateral conveyor and the positioning skids associated therewith.
Figure 4:
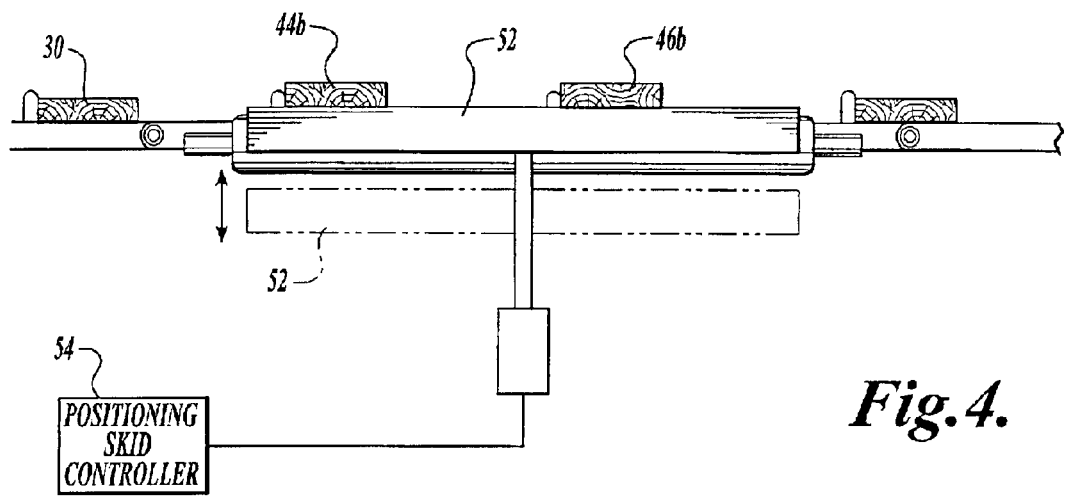
FIG. 4 is an enlarged elevation view of FIG. 3.

Downstream from the sawing station, a plurality of aligning conveyor rollers 40 have their axes aligned parallel to the machine direction 14 and are positioned between successive runs of the conveyor chains 12a–12k. The upper surface of the rollers 40, as shown in FIGS. 3 and 4, are positioned slightly above the upper surface of the conveyor chains 12a–12k. The rollers 40 are mounted for rotation by conventional means not shown, to rotate in a clockwise direction looking in the machine direction 14. As successive boards, for example boards 44a and 46a, pass over the aligning rollers 40, they will be moved laterally in a right-hand direction as indicated by arrow 50. The boards 44a and 46a will be moved laterally until the right-hand ends of the boards 44a and 46a abut the rail comprising the right-hand lumber line 32.

Referring to FIGS. 3 and 4, the left-hand board segments 44b and 46b, corresponding to right-hand segments 44a and 46b, are shown being held in a position above the rollers 40 by a plurality of positioning skids 52 as they pass over aligning rollers 40. The positioning skids 52 are positioned in a conventional manner between the left hand portion of rollers 40. The positioning skids are mounted by conventional means for movement in a vertical direction in response to signals from the positioning skid controller 54, at the appropriate time. For example, as boards 44a and 44b are being moved to the right by aligning rollers 40, positioning skids are raised by the controller 54 so as to raise segments 44b and 46b above the rollers 40. Thus board segments 44b and 46b remain laterally stationary as they traverse over the right-hand aligning rollers 40. When, for example, a longer board, such as board 58, traversed the right-hand aligning rollers 40, the positioning skids 52 are lowered to the position shown in phantom in FIG. 4 as board 58 passed over the positioning skids so all of the rollers 40 could have effectively functioned to move the board 58 laterally against the right-hand lumber line 32.

A second set of aligning rollers 60 are positioned downstream from the right-hand aligning rollers 40 between the runs of chains 12a–12e and adjacent the left-hand side of the conveyor 12. Aligning rollers 60 are rotated in a counterclockwise direction looking in the machine direction 14. As boards, for example, board segments 62b and 64b, pass over the rollers 60, they will be moved laterally in a left-hand direction as indicated by arrow 68 toward left-hand lumber line 34 until their left ends abut against the left-hand lumber line 34. Thus, the left-hand segments of boards 62b and 64b are aligned to the left-hand lumber line 34 so that they can be sorted separately from the right-hand portions of the boards 62a and 64a. Positioning skids 66 are positioned between the aligning rollers 60. The skids 66 are in the downward position (corresponding to the position of skid 52 shown in FIG. 4 for the right-hand aligning skids) when boards pass thereover to be aligned to the left-hand lumber line 34. However, as board 58, for example, passes over the left-hand aligning rollers 60, the positioning skids 66 will be raised so that the left-hand aligning rollers 60 will not contact the board 58 and move it away from its alignment with the right-hand lumber line 32.

A plurality of right-hand lumber bins 80, 82, 84, 86, 88, 90, and 92 are positioned below the upper run of the conveyor 12 and have their right-hand ends aligned with the right-hand lumber line 32. These bins 80–92 are shown for purposes of illustration as corresponding to lumber lengths of 8 ft. to 20 ft., respectively. Fewer or more bins may be employed, as needed or desired. Also, if four grades of wood are being sorted, each of the bins 80-92 would have three corresponding partners for receiving the other three grades of boards of the same length. For example, there might be four bins for 8 ft. lengths of lumber, one for the highest grade of lumber, one for the second grade of lumber, another for the third grade of lumber, and a fourth bin containing the lowest lumber grade. For purposes of simplicity in illustration, however, only one bin has been shown for each length of wood. These bins 80–92 are for receiving the various lengths of lumber aligned with the right-hand lumber line 32. A drop gate controller 70 of conventional design receives control signals from the logic controller 21 and controls drop gates 72 on each of the conveyor chains 12a–12k so as to drop 8 ft. lengths of lumber, for example, into bin 80 and 14 ft. lengths of lumber into bin 86. The drop gates on the right-hand side are of conventional design but are modified to drop boards only into the right-hand bins 80 to 92.

Positioned adjacent the left-hand side of the conveyor 12 are additional bins 100, 102, and 104. These bins 100, 102, and 104 have their left ends aligned with the left-hand lumber line 34 and are positioned to receive various lengths of lumber aligned with the left-hand lumber line 34. For example, in the illustration, bin 100 is sized to receive 12 ft. lengths of lumber, bin 102, 10 ft. lengths, and bin 104, 8 ft. lengths. Similarly to bins 80–92, bins 100–104 may have counterparts for receiving the different grades of lumber as desired. Drop gates (not shown) controlled by drop gate controller 70 drop the lumber into bins 100 to 104 based on control signals transmitted from the logic controller 21 to the drop gate controller 70. The drop gates on the left-hand side are of conventional design, but modified only to drop boards into the left-hand bins 100 to 104.

By adding the left-hand lumber line 34, aligning rolls 60 with positioning skids 52 and 66, and bins 100 to 104, the need to index and align left-hand board segments to the right-hand lumber line is eliminated. In this manner, the machine throughput can be maximized to at or near 100% of the theoretical maximum. In large sawmills, this efficiency increase can result in savings on the order of several million dollars per year.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus for cutting and sorting boards into variable lengths comprising:
   a conveyor to convey boards along a path,
   a sensor positioned along said path for determining the length of a board as it passes thereby, said sensor producing a length signal indicative of said length,
   a controller for receiving said length signal and determining whether said board will be cut and at what location along the length of said board it will be cut,
   a saw positioned along the said path controlled by said controller, said saw cutting said board at said location,
   a first lumber line contiguous the right side of said path looking in the machine direction,
   a second lumber line contiguous the left side of said path looking in the machine direction,
   a first lateral conveyor for moving a board adjacent the right side of said path so that the right end of the board abuts said first lumber line,
   a second lateral conveyor for moving a board adjacent the left side of said path so that the left end of the board abuts said second lumber line,
   a first plurality of bins successively positioned along the right side of said path for selectively receiving boards of predetermined length aligned against said first lumber line, and
   a second plurality of bins successively positioned along the left side of said path for selectively receiving boards of predetermined length aligned against said second lumber line.

2. The apparatus of claim 1, wherein said controller selectively places boards of a predetermined length in common ones of said first plurality of bins.

3. The apparatus of claim 2, wherein said controller selectively places boards of a predetermined length in common ones of said second plurality of bins.

4. The apparatus of claim 1, wherein the sensor further determines the shape of the board and produces a signal indicative of the grade and of the length thereof.

* * * * *